Patented Apr. 21, 1942

2,280,365

UNITED STATES PATENT OFFICE 2,280,365

METHOD OF BOTTLING BEVERAGES

Willard E. Baier, Ontario, Calif., assignor to California Fruit Growers Exchange, Los Angeles, Calif., a corporation of California No Drawing. Application January 2, 1940,
Serial No. 311,988

4 Claims. (Cl. 99—28)

This invention relates to a process for the preparation of sterile bottled beverages, and in particular relates to a process for the preparation of sterile bottled beverages which have a very low carbonation and beverages with no carbonization, that is, still beverages.

Fruit juices, and particularly citrus fruit juices, contain a number of constituents which make them healthful and desirable for human consumption. Unfortunately, however, these same constituents also promote the growth of microorganisms which cause spoilage of the juices. This spoilage is of particular importance to the bottler of these beverages.

Many years ago when the bottlers of carbonated beverages began the extensive use of citrus fruit juice beverages, in addition to their other beverages, a small amount of sodium benzoate was found necessary as a preservative in order that these citrus juice-containing beverages would not be more susceptible to spoilage than the carbonated beverages heretofore prepared which, for the most part, were made up from synthetic flavors and contained no preservative.

Sodium benzoate, in the very small amounts required when all sanitary precautions are taken, is not in the least harmful to the consumer, nor is it apparent to the taste except in the case of a relatively few individuals whose taste perception toward benzoic acid is extremely sensitive. Nevertheless, there has been a tendency to decrease the sodium benzoate content in such beverages. This has been possible to a very considerable extent in view of the fact that the beverage bases are now usually supplied to the bottler in a sterile condition in hermetically sealed containers and the sanitary precautions used in the modern bottling plants generally have improved together with improvements in equipment and supplies. In some instances, the sodium benzoate has been omitted altogether from juice beverages. In such cases, the preparation of the syrup and of the carbonated water and the entire bottling operation are carried out in such a manner that the possibility of contamination is at a minimum. Also, a high carbonation in these bottled beverages is depended upon to control the few organisms which might cause spoilage of the beverage and which may find their way into the bottled beverage during the course of the bottling process.

There is in use a further process of bottling fruit juice beverages without the use of preservatives, and it is this process that is used to a considerable extent in the canning industry. The process consists in subjecting the contents of the sealed package containing the food or beverage to a sufficiently high temperature to kill the undesirable organisms. By this process, some of the highest quality products are produced. Ordinarily, however, this process requires rather expensive equipment, and, therefore, pasteurization or high temperature treatment of beverages in the bottle is not a very common practice. The only other procedure which has remained for the bottler to use and which he may be assured of a safe operation without pasteurization is the use of high carbonation, as mentioned hereinbefore.

Recently, however, there has been a trend toward beverages with very low carbonation or even without any carbonation, these latter being known as still beverages. Unfortunately, in the manufacture of this type of product, it is very dangerous to bottle the beverage without sodium benzoate or other acceptable preservative or adequate pasteurization in the bottle. Nevertheless, it has been found desirable to have a certain small amount of carbonation in order to completely displace from the head space of the bottles the atmospheric oxygen which is detrimental to the flavor and keeping qualities of the bottled product. Consideration of the various factors hereinabove set forth has led me to the development of a new method for the preparation of sterile, low carbonated, or still beverages in the equipment already available in bottling plants with but little modification.

Accordingly, an object of this invention is to provide and disclose methods and means for the preparation of sterile, low carbonated, bottled beverages.

A further object of this invention is to provide and disclose methods and means of preparing a nearly still beverage in which the atmospheric oxygen has been displaced from the head space of the bottles.

A still further object of this invention is to provide and disclose methods and means for the preparation of a sterile citrus fruit juice beverage having little or no carbonation.

Other objects and advantages will appear more fully and at large hereinafter and will be apparent from a description of the process and product embodying the invention and will present themselves to those skilled in the art in the contemplation and use of this invention.

It is to be understood that this invention is directed to the treatment of any and all types of fruit juice beverages, and, furthermore, the process is applicable to beverages prepared from synthetic bases.

In general, my process may be carried out as follows, using the equipment already generally available in bottling plants. If, for the purpose of carrying out my invention, some modification of the generally available equipment is necessary, suggestions for such modification will be pointed out hereinafter.

The water, suitably treated and filtered if necessary, is supplied to the carbonator through a thermostatically controlled steam heater or a storage type gas-fired water heater which likewise could be thermostatically controlled. Whereas, in the usual bottling process heretofore used, the water is supplied to the carbonator at a relatively low temperature, in my process it is heated to within the range from about 160° F. to 200° F., depending upon the type of beverage and bottling conditions. At temperatures within this range there is only a limited absorption of the carbon dioxide gas, even though the carbonator be operated at the usual pressure of 30 to 60 pounds per square inch. The consumption of gas is thus very small, but it serves two important purposes. In the first place, the carbon dioxide gas displaces, through the purge valve of the carbonator, any air carried into this system with the water. Secondly, the gas pressure serves to operate the filler in the usual manner. The bottles used in my process are preferably discharged from the bottle washing machine while still hot, which is both an operating convenience and a sanitary advantage. The proper amount of flavored syrup or base containing the citrus juice or other fruit juice and prepared in accordance with all of the usual precautions, is introduced into the warm bottles under the syruper, and the hot, slightly carbonated water added in the usual way. The pressure of carbon dioxide gas performs its function of displacing air from the head space of the bottle by way of the snift, in the case of the high pressure type machine. In those bottling operations where the low pressure type machine is used and where the carbonating and crowning or capping operations are separate, there is sufficient gas in the hot water to displace the air in the head space. With either type of machine, deaeration is more effective than the ordinary practice for the reason that the syrup diffuses into the hot water much more readily and the air which it carries is readily eliminated.

The filled bottles are preferably shaken by any of the usual types of bottle agitators. This serves to equalize the temperature which will now be perhaps about 140° F. or higher, and insures sterilization of the crown liner and any and all parts of the bottle and its contents. The beverage temperature and holding time at the elevated temperature necessary to insure satisfactory sterilization vary with the type of beverage and other conditions. The hot bottles may be filled into the cases upside down and a suitable holding time allowed before cooling. Cooling may be accomplished in any of the several usual ways, as, for example, by a spray of water while on the bottle conveyor or over the wood cases later, depending upon the holding time desired at the elevated temperature. Even if cooling is allowed to take place in air, there is no observable detrimental effect to the beverage, presumably because the atmospheric oxygen has been substantially removed.

The process may be used with many modifications as to temperature and gas pressure. In the high pressure type machines a very slight carbonation may result in the finished bottled beverage, or the conditions may be so adjusted as to result in a finished product which is substantially free from carbonation. Although I have indicated that water temperatures may be as high as about 200° F., it will be found that this is not necessary if the bottles are clean, sterile, and fairly warm, and if the crowns or caps are clean, and if the syrup is prepared from sterile bases with good clean sugar and satisfactory technic. On the other hand, water temperatures as low as 160° F. may be effectively employed.

An equalized beverage temperature as low as 130° F. may be effective with certain types of citrus beverages, but I have found it desirable and preferable to employ temperatures not lower than about 140° F., as above set forth.

This process assumes that all the heat-resistant organisms which might accompany the preparation of fruit juice beverage bases have been eliminated on the part of the manufacturer of the base. Owing to the fact that the heat exerts its effect in the finished bottled beverage in the presence of the fruit acids used, there is rapid destruction of air-borne organisms or those organisms which are introduced in the sugar syrup.

With respect to the standard bottling equipment now available, some of the gaskets and packing materials are not designed to withstand the high temperatures disclosed in the above process. It will be necessary, therefore, to make some modifications in the packing material and gasket material used in these machines. However, since there is commercially available such materials as are suitable and adapted to be operated under conditions of much higher temperatures, no difficulty will be encountered in modifying the present apparatus to this extent.

It is, of course, obvious, that this method of preparing sterile bottle beverages may be adapted for use in those processes which use machines to pre-mix the beverage before carbonation.

Any and all changes, modifications, or alterations coming within the scope of the appended claims are to be considered embraced thereby.

I claim:

1. A process for the preparation of bottled fruit juice beverages which comprises the steps of adding a quantity of a beverage syrup to a bottle, diluting said syrup with a quantity of water having a temperature of from 160° F. to 200° F., said water having an appreciable amount of carbon dioxide gas dissolved therein, capping said bottled beverage and subsequently cooling the same.

2. A process for the preparation of beverages which comprises the steps of adding a quantity of a beverage syrup to a bottle, diluting said syrup with a quantity of water having a temperature of from 160° F. to 200° F., said water having an appreciable amount of carbon dioxide gas dissolved therein, capping said bottled beverage and subsequently cooling the same.

3. A process for the preparation of a bottled beverage which comprises the steps of heating water to a temperature of from about 160° F. to 200° F., saturating said water with carbon dioxide, adding a beverage syrup to a bottle, diluting said beverage syrup in the bottle with the hot carbonated water, said water being forced into the bottles due to the pressure of the carbon dioxide gas.

4. A process for the preparation of a bottled beverage which comprises adding a beverage syrup to a bottle, diluting said syrup in the bottle with water having a temperature of from 160° F. to 200° F., said water being saturated with carbon dioxide, capping the bottle beverage, maintaining the bottled beverage at a temperature and for a sufficient length of time to insure sterilization of the contents, and finally cooling the bottled beverage.

WILLARD E. BAIER.